Aug. 8, 1933.  J. O. LEWIS  1,921,298
VALVE
Original Filed July 15, 1927  2 Sheets-Sheet 1
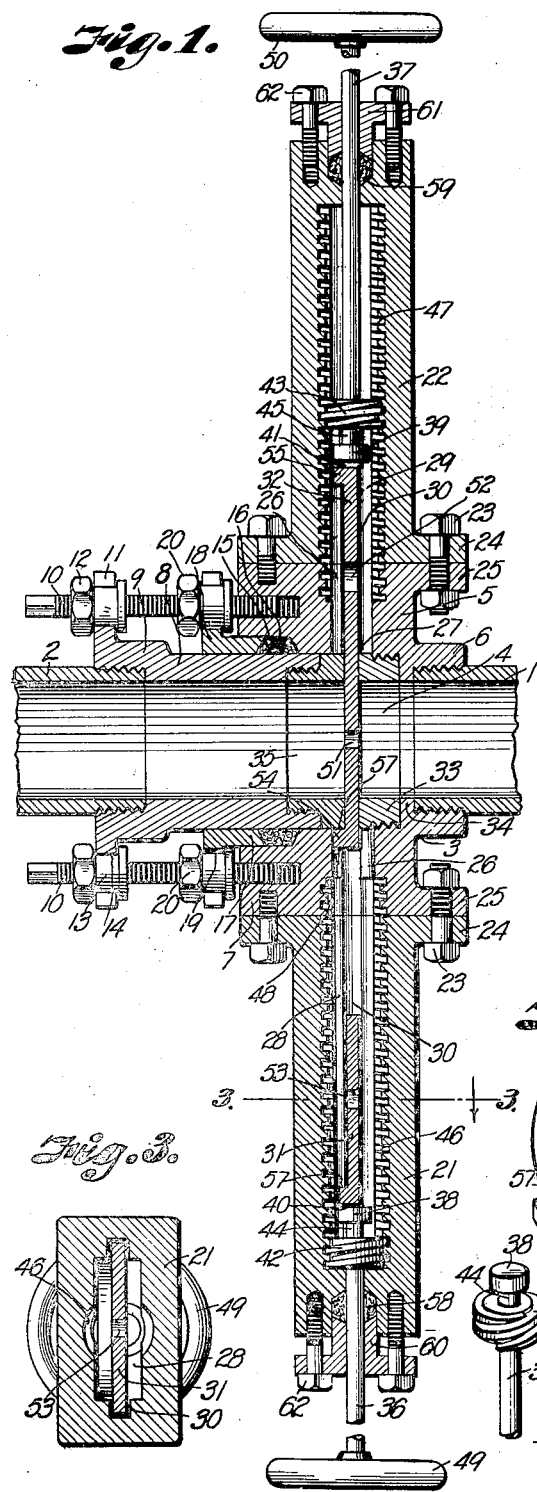
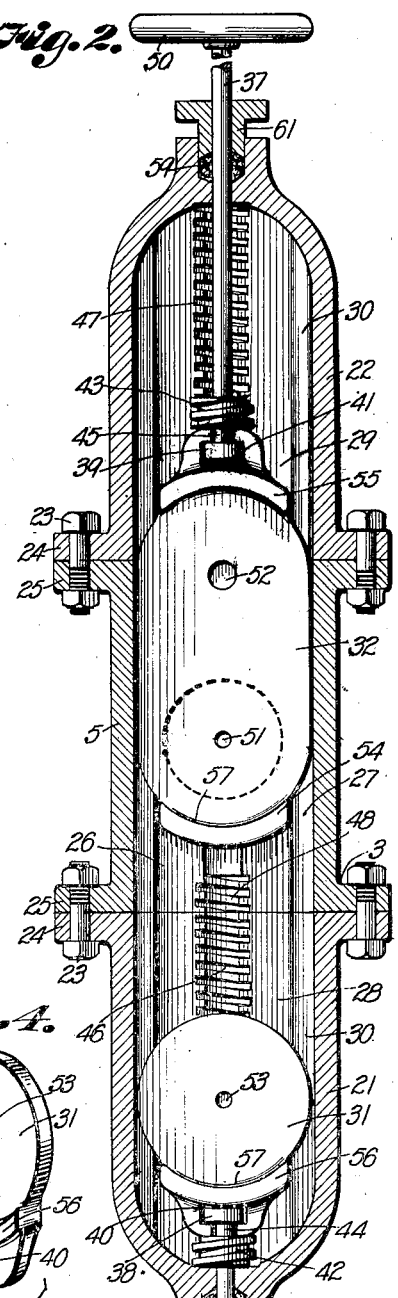
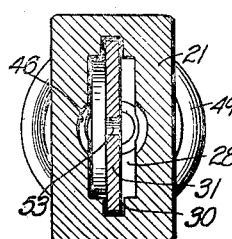
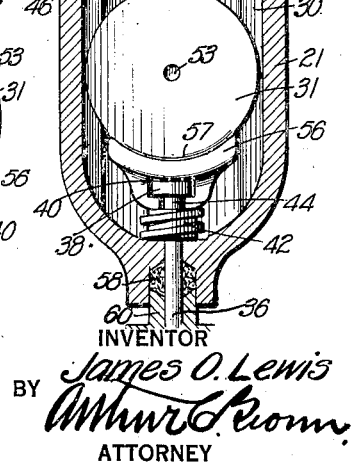
INVENTOR
James O. Lewis
BY Arthur C. Brown
ATTORNEY

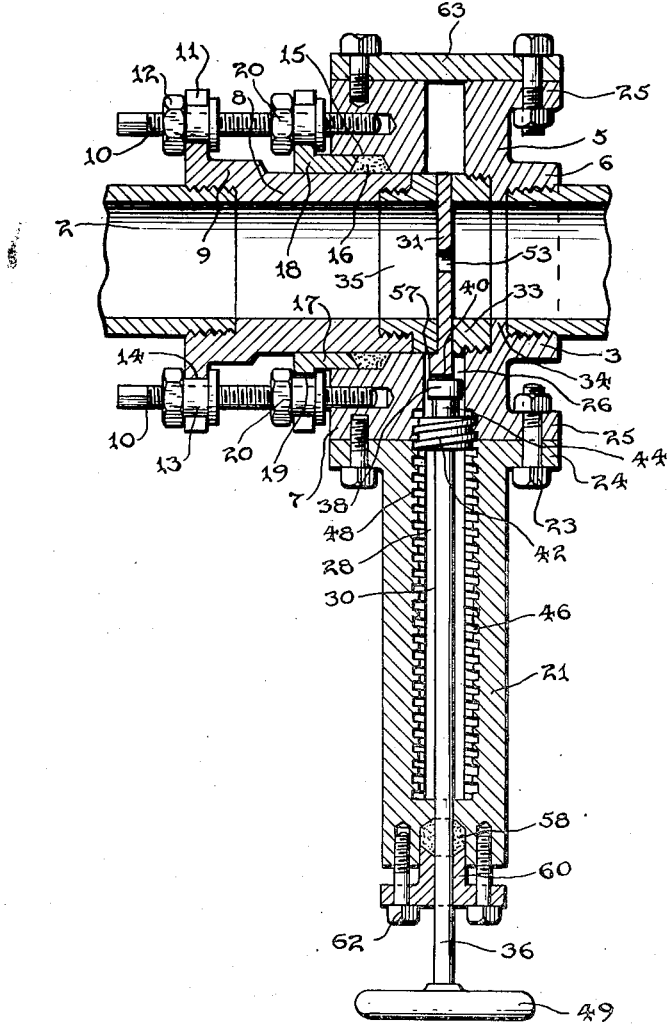

Patented Aug. 8, 1933

1,921,298

UNITED STATES PATENT OFFICE 1,921,298

VALVE

James O. Lewis, Tulsa, Okla., assignor to D L P Valve Company, Tulsa, Okla., a Trust Application July 15, 1927, Serial No. 205,946
Renewed January 13, 1932

19 Claims. (Cl. 137—75)

My invention relates to valves, and more particularly a valve of that type wherein a stop or orifice plate may be replaced in its housing without interruption of flow through or leakage from the line controlled by the valve during the replacing operation, the invention being especially adaptable for use in connection with orifice meters or valves employing orifice disks and hereafter described in its relation to such specific use.

Orifice change valves are designed to permit the withdrawal of an orifice plate for inspection or replacement and the process is ordinarily attended by the by-passing of the fluid, the absence of an orifice plate in the flow channel, or the stoppage of the flow. When it is desired to change the dimension of the opening in an orifice plate, the plate is changed and the same process is followed as in removal of a plate for inspection.

My invention provides means for installing a substitute plate, either of the same measuring characteristics or of a desired different one, substantially at the same time as the withdrawal of the plate being removed.

In accomplishing these objects of the invention I have provided improved details of structure, the preferred forms of which are illustrated in the accompanying drawings, wherein:

Fig. 1 is a longitudinal sectional view of a device embodying my improvements installed in a flow line, an elongated orifice plate being shown in flow-throttling position and an orifice disk in position for removal.

Fig. 2 is a longitudinal vertical sectional view through the device, the parts being shown in the same position as in Fig. 1.

Fig. 3 is a transverse section on the line 3—3, Fig. 1.

Fig. 4 is a perspective view of an orifice disk and portion of an actuating screw stem associable therewith.

Fig. 5 is a longitudinal section of a single bonnet type of valve embodying the invention.

Referring in detail to the drawings:

1 and 2 designate sections of a flow line and 3 designates generally a housing element connecting said sections having the through channel 4, and comprising a body member 5 having an annular flange 6 to receive the inlet section of the flow line and a portion 7 having an enlarged channel in which a clamping sleeve 8 is slidable. An enlarged outer end 9 of the sleeve receives the outlet section 2 of the flow line and stud bolts 10 fixed in said portion 7 parallel to the flow channel project through ears 11 on the outer end 9 of the sleeve, nuts 12 having recessed portions 13 engaged in slots 14 of the ears being threaded on the studs to enforce the sleeve inwardly of the body member.

An annular recess 15 is provided in the portion 7 in which a packing ring 16 is positioned. A packing gland 17 having a flange 18 bears against the ring 16, the studs 10 extending through slots 19 in the flange and nuts 20 on the studs enforcing the gland against the packing to seal the joint between the body member and the sleeve, seating members being interposed centrally of the housing for actuation by the sleeve, which will later be described.

Bonnet members 21 and 22 are provided, extending oppositely from the body member 6 and secured thereto by bolts 23 extending through ears 24 of the bonnet members and ears 25 of the body member.

The body member is provided with a rectangular chamber or slot 26 extending therethrough and with guide grooves or side guides 27, extending outwardly from the slot, the slot intersecting the flow channel at right angles. The bonnets are provided with similar rectangular chambers 28 and 29 aligned with said slot and with guide grooves or side guides 30 which align with the grooves 27 in the body member. An orifice disk 31 and an orifice plate 32 are slidable respectively on each side of the housing in the grooves 30 in the bonnet chambers and adjacent grooves 27 of the body member; for example, the disk 31 being positioned slidably in the chamber 28, whereby a disk or plate may be moved into position in the flow channel to throttle the flow of fluid, by means to be described, the vertical edges of the disk sliding in the grooves 30 and 27.

Means for seating the orifice elements in flow-throttling position consist of a fixed seating ring 33, screw-threadedly engaged with the body member 5 and bearing against a shoulder 34 of the body member adjacent the inlet section 1, and a movable seating ring 35 screw-threadedly engaged with the inner end of the sleeve 8. The seating rings are provided to admit an orifice disk or orifice plate between them, the ring 35 being projectible against an orifice element to clamp the element between the two seating rings by actuation of the nuts 12 on the studs 10 against the clamping sleeve. Slight movement of the sleeve, therefore, in its sliding position permits the release of an orifice element or seals the flow channel from the rectangular slot of the body portion 5.

The means provided for actuating the orifice elements comprises screw stems 36 and 37 projected into the chambers 28 and 29 respectively, having similar connector heads 38 and 39 engageable with dove-tailed notches 40 and 41 in the outer edges of the orifice elements, and threaded portions 42 and 43 spaced from the heads by necks 44 and 45, the threaded portions being engaged in thread-receiving, semi-circular grooves 46 and 47 in the inner walls of the bonnets, and grooves 48 in the body member, along the aligning chambers and rectangular slot referred to.

The stems are rotatable by hand wheels 49 and 50 to reciprocate in the chambers and slots to move the orifice plate or the orifice disk into or out of position in relation to the flow channel.

An orifice element, for example, the orifice disk 31, as illustrated, positioned remote from the flow channel and within the bonnet 21, is sealed from the flow channel by the secure seating of the orifice element 32 under influence of the clamping sleeve 8, so that the bonnet member may be removed from the body portion 5 of the housing and the orifice disk 31 may be removed for inspection or replacement.

The orifice plate 32 is an elongated orifice element having an orifice 51 which, in Fig. 1, is shown concentric with the flow channel, and a larger orifice 52 which may be positioned in the flow channel by projecting the screw stem inwardly in the bonnet and the head portion, whereby the end portion of the plate having the orifice 51 is extended into the opposite bonnet 21. The orifice of the disk 31 is designated 53, and is smaller than the orifice 51.

Stop segments 54 and 55 are provided on the plate 32 adjacent the ends thereof and a like segment 56 is provided on the outer end of the disk 31. The inner arcuate edges 57 of the segments have chords less than the diameter of the orifice plate and disk, the bodies of the segments sliding in the slots 26 and chambers 28 and 29, while the projecting edges of the plate and disk slide in the grooves 27 and 30. The arcuate edges 57 are concentric with their respective orifices and are adapted for engaging the outer surface of the seating ring 35 so that when either one of the orifices is being positioned in the line of flow, its concentric position therein is determined by the engagement of the segment with the seating ring.

Sealing of the stems in relation to the bonnet is provided by packing rings 58 and 59 and packing glands 60 and 61 which are impelled against the packing by bolts 62 screw-threadedly engaged in the ends of the bonnets.

Referring to Fig. 1 the device is shown mounted on a flow line and the plate 32 is clamped between the seating rings 33 and 35 with the orifice 51, which is of an intermediate size compared to the orifices 52 and 53, in functional position in the flow line.

Should it for any reason be desirable to change to either the larger or the smaller orifice while fluid is actualy flowing through the device, the change is made in the following manner:

The adjusting nuts 12 engaged in the ears 11 on the clamp sleeve 8 and on the stud bolts 10 fixed in the body member, are rotated so as to withdraw the seating ring 35 from its clamping engagement against the plate 32. Being thus released, the plate 32 is shifted downward by rotation of the handle 50, should it be desired to place the larger orifice 52 in the line of flow. But should it be preferable to place the smaller orifice 53 of the disk 31 in the flow line, the seating ring 35 is first withdrawn sufficiently to provide clearance for the segment 54 and the plate 32 is then withdrawn completely out of the line of flow. After the plate 32 is withdrawn, the seating ring 35 is moved inwardly sufficiently to intercept the segment 56 and the disk 31 is then shifted into position by operation of handle 49 so that the orifice 53 therein will be positioned for operation. In either instance, after the desired orifice has been properly positioned by the engagement of its relative stop segment with the seating ring 35, it is then necessary to clamp the orifice element between the rings 33 and 35 and this is effected by actuation of the nuts 12 which actuate the clamping member 8 inwardly and cause the ring 35 to press the orifice disk against the ring 33 and thus seal the joint to prevent leakage of the fluid.

If it is desired, both plates may be removed from the flow line into their respective bonnets which are sealed off from the flow line by fitting seat 35 against seat 33. In this position, either or both of the bonnets may be removed from the housing.

When one of the orifice plates is clamped in position, the bonnet containing the other orifice plate may be removed for change or inspection of the orifice plate, and with this condition, the metering operation is only momentary halted during the plate-shifting operation.

I prefer to place my valve in the flow line so that the movable seat member is down stream with reference to the flow of fluid through the line and I also prefer to position my grooves so that while the plate is permitted to be forced against the fixed seat it is prevented from touching the housing opposite the fixed seat. With this arrangement the valve is easily opened against high differential pressures across the valve. When a shut off plate is in the line and it is desired to open the valve, the movable seat is backed away from the plate which under the upstream pressure follows until it is held by the grooves whereupon the fluid can by pass around the plate, thus largely equalizing the pressure so that the plate can be easily withdrawn into its housing.

It is apparent that the bonnet elements may be provided of any desired type so that orifice plates having any desired number of different sized openings may be installed, suitable spacing between the inner ends of opposed screw stems and of orifice elements positioned in the bonnet being provided for, or only one bonnet may be used, the opposite side of the housing 3 being closed by a plate 63 bolted onto it. In said Figure 5, the plate 63 is employed in place, for example, of the bonnet member 22 and the parts directly and indirectly carried thereby. Otherwise, the structure of Figure 5 is identical—both structurally and functionally—with that illustrated in Figures 1 and 2.

What I claim and desire to secure by Letters Patent is:

1. In combination with a flow line, a housing interposed in said line including a movable seat member and having a flow channel and oppositely related slots opening to said channel, separate bonnets removably mounted on said housing having slots registering with the housing slots, separate orifice plates mounted in respective bonnets and movable in said slots for selective location in said housing, and means for setting the movable seat member to seal a positioned orifice member in the housing.

2. In combination with a flow line, a housing interposed in said line including a movable seat member and having a flow channel and oppositely related slots opening to said channel, separate bonnets removably mounted on said housing having slots registering with the housing slots, orifice members movable in said slots for selective location in said housing, means for setting the movable seat member to seal a positioned orifice member in the housing, and stop members on the orifice members for centering orifices in the orifice members with the flow channel.

3. In combination with a flow line, a housing in said line, having a flow channel coincident with said line, having oppositely related slots opening to said channel and including guide grooves, an adjustable seat member in said housing, bonnets removably mounted on the housing having slots and grooves registering with those of the housing, orifice members slidable in the housing grooves and in respective bonnet grooves, means for shifting the orifice members, stop members on the orifice members for limiting projection of the orifice members into the housing, and means for shifting the adjustable seat member to seal a positioned orifice member in the housing.

4. In combination with a flow line, a housing in said line, having a flow channel coincident with said line, having oppositely related slots opening to said channel and including guide grooves, an adjustable seat member in said housing, bonnets removably mounted on the housing having slots and grooves registering with those of the housing, separate orifice members slidable in the housing grooves and in respective bonnet grooves and removable with their respective bonnets, means for shifting said members, and means for shifting the adjustable seat member to seal a positioned orifice member in the housing.

5. In combination with a flow line, a housing in said line, having a flow channel coincident with said line, having oppositely related slots opening to said channel and including guide grooves, an adjustable seat member in said housing, bonnets removably mounted on the housing having slots and grooves registering with those of the housing, separate orifice members in the respective bonnets slidable in the housing grooves and in respective bonnet grooves for adjustment in the housing, means for shifting the orifice members, and means for shifting the adjustable seat member to seal a positioned orifice member in the housing, the orifice members being removable with their respective bonnets.

6. In combination with a flow line, a housing in said line, having a flow channel coincident with said line, having oppositely related slots opening to said channel and including guide grooves, an adjustable seat member in said housing, a bonnet on the housing having slots and grooves registering with those of the housing, a plate having a plurality of spaced orifices slidable in the housing and bonnet grooves, means for shifting the plate, stop means on the plate engageable with the seat member for selectively centering the orifices with the flow channel, and means for shifting the adjustable seat member to seal a positioned orifice member in the housing.

7. In combination with a flow line, a housing in said line, having a flow channel coincident with said line, having oppositely related slots opening to said channel and including side guides, an adjustable seat member in said housing, bonnets removably mounted on the housing having slots and guides registering with those of the housing, orifice members slidable in the housing guides and in respective bonnet guides, means for shifting the orifice members, stop members on the orifice member for limiting projection of the orifice members into the housing, and means for shifting the adjustable seat member to seal a positioned member in the housing.

8. In combination with a flow line, a housing in said line, having a flow channel coincident with said line, having oppositely related slots opening to said channel and including side guides, an adjustable seat member in said housing, bonnets removably mounted on the housing having slots and guides registering with those of the housing, separate orifice members slidable in the housing guides and in respective bonnet guides, and removable with their respective bonnets, means for shifting said members, and means for shifting the adjustable seat member to seal a positioned orifice member in the housing.

9. In a valve of the character described, a housing including cooperative seat members axially aligned with a flow channel therethrough, at least one seat member being longitudinally movable relative to the other and adapted for providing a space between the seat members for a cooperative valve plate member, the housing having separate extensions each provided with a chamber adapted to receive a valve plate member and communicating with the space between the valve seats, there being elements adapted to seal each chamber and removable therefrom to permit insertion or removal of a valve plate member, separate valve plates for each chamber adapted for positioning between the seat members, means for moving each valve plate from and into its corresponding chamber and into and from the space between the seats, and means for shifting the movable seat member into and from sealing engagement with a valve plate positioned between the seats.

10. In combination in a valve of the character described a valve body housing provided with cooperating valve seat members constituting an essential part of a flow line, at least one of which seat members is longitudinally movable relative to the other and parallel to the flow line, a plurality of movable valve elements each transversely movable into and from operative position between said valve seat members, connecting means between the movable valve seat member and its companion seat member for longitudinally moving the seat members relative to each other in a manner to seal a positioned valve element between them, said valve body housing having chamber portions each for the reception of the movable valve element corresponding thereto, a removable cover for each chamber portion constructed so as to seal said chamber portion when the cover is in place, and means for transversely moving each valve element to and from operative position between said valve seat members, the construction being such that during such transverse movement the valve structure as a whole is sealed against the escape of fluid from the interior of the valve to the exterior thereof but so that when one valve element is in its operative position and is held sealed by and between the valve seat members the cover corresponding to another valve element can be removed to permit the removal of the last mentioned valve element without permitting the escape of fluid from the interior of the flow line from any place where it can contact with any other part of the valve structure.

11. A valve constructed according to the claim last preceding in which the movable seat member is slidably mounted in the valve body housing and in which there is a sealing packing ring surrounding and circumferentially engaging the exterior of the movable seat member and located in a packing receiving space in the valve body housing.

12. In combination in a valve of the character described a valve body housing provided with cooperating valve seat members constituting an essential part of the flow line, at least one of which seat members is longitudinally movable relative to the other and parallel to the flow line, a valve element transversely movable selectively into and from a plurality of seating positions between said valve seat members and entirely from between said seat members which valve element has an opening providing a defined orifice for functioning when the valve is in one of its plural positions, connecting means between the movable valve seat member and its companion seat member for longitudinally moving the movable seat member relative to the other seat member in a manner to engage and seal the valve element when positioned between them and to effect sealing engagement of the seat members one with the other when the valve element is entirely removed from between the seat members, said housing having a chamber portion for the reception of the movable valve element, a removable cover for said chamber portion constructed so as to seal said chamber portion when the cover is in place and means for transversely moving said valve element to and from its sealing positions between said valve members, the construction being such that during such transverse movement the valve structure as a whole is sealed against the escape of fluid from the interior of the valve but so that when the valve element is in any of its seating positions and is held sealed by and between the valve seat members the escape of fluid from the flow line into the rest of the valve structure is prevented.

13. In combination in a valve of the character described a valve body housing provided with cooperating valve seat members constituting an essential part of a flow line, at least one of which seat members is movable relative to the other and parallel to the flow line, a multi-positionable valve element transversely movable selectively into and from a plurality of sealing positions between said valve seat members and entirely from between said seat members, there being provided means extending from and between the movable valve seat member and its companion seat member for effecting longitudinal movement of said seat member relative to its mating member in a manner to engage and seal the multi-positionable valve element when positioned between them and to effect sealing engagement of the seat members one with the other when the valve element is entirely removed from between the seat members, said body housing having a chamber portion for the reception of the multi-positionable valve element, a removable cover for said chamber portion constructed so as to close said portion when the cover is in place and means for transversely moving said multi-positionable valve element to and from its sealing positions between said valve seat members, the construction being such that during such transverse movement the valve structure as a whole is sealed against the escape of fluid from the interior of the valve and so that when the valve element is entirely removed from plural sealing positions and the valve seat members are in sealing engagement the cover can be removed without permitting the escape of fluid from the flow line.

14. A valve of the character described including a housing, valve seats in the housing axially aligned with a flow channel therethrough, one longitudinally movable toward and from the other and adapted for providing a space for receiving a valve plate between the seats, the housing including separate lateral extensions each having a chamber adapted for communicating with the space between the valve seats, valve plates individually movable from and into the space between the valve seats to and from the respective lateral extension chambers, means on the housing extensions for closing the chambers while the plates are being changed and removable to permit removal of one valve plate while the other is in line closing relation with the seats, and means for selectively shifting the plates from the exterior of the housing.

15. In a valve of the character described, a housing including valve seats having flow channels arranged for alignment with a line channel to which the valve is connected, one of the valve seats being longitudinally movable to and from the other to seal a valve plate between the seats or to release the plate, the housing including transverse chambers adapted for receiving a multi-positionable valve plate movable between the valve seats, removable closure means for each of said chambers, a multi-positionable valve plate, means operable from the exterior of the housing for shifting the valve plate into and from the chambers to its different seating positions and entirely into one of said chambers, means operable from the exterior of the housing for shifting the movable valve seat into and from sealing engagement with the multi-positionable valve plate when the plate is positioned between the seats or into sealing engagement with its mating seat when the plate is entirely removed from between the seats to confine the fluid to the flow channels, and an annular packing between the movable valve seat and the housing, the movable valve seat being constructed for fluid tight connection to the line.

16. In combination with a flow line, a housing interpositioned in said line including seat members, one movable with respect to the other, plate receiving chambers on opposite sides of the line, a plate having a plurality of orifices slidable between the seat members, means for shifting the plate to selectively position an orificed portion of the plate between the seats or position the plate wholly within one of the respective chambers, means for moving one of the seat members to seal the plate between the seats or to effect sealing engagement of the seats one with the other when the plate is wholly removed from between the seats, and means for connecting the two ends of the flow line to the housing to prevent parting of the line.

17. In combination with and in a flow line, a housing with a removable bonnet detachably secured thereto in a manner to provide a tight joint between the housing and the bonnet, said housing having a flow line portion including one seat member attached to the housing and one seat member movable in the housing and attached to another member of the flow line, an annular packing between the movable seat member and the housing, means for moving the movable seat member to forcibly engage a plate between the seat members and to thereby seal off the flow channel from the housing, plate receiving chambers on opposite sides of the flow channel, a multi-positionable plate slidable in the chambers and extending through the space between the seat members, means for selectively positioning the plate with respect to the chambers and in any of its positions between the seat members, there being packing between said last mentioned means and said housing, the construction being such that when the seat members are in sealing position with respect to the valve plate in its different positions the packing can be replaced.

18. In combination with a flow line, a housing interpositioned in said line including cooperative annular seat members aligned with the flow line, one seat member being attached to the housing and the other seat member being attached to the flow line and movable in the housing to seal a multi-positionable plate member between the seat members, adjustable means attaching the housing to the flow line and operable to move the seat, plate receiving chambers on opposite sides of the flow line, a plate slidable in the chambers and between the seats, and means operable to selectively position the plate in the chambers and in its different positions between the seats.

19. An orifice fitting comprising a body having means for connecting it in a line and provided with a flow-bore, an orifice plate extending across said flow-bore, said body being provided with a transverse passage through which said orifice plate may be withdrawn and being otherwise peripherally closed fluid-tightly, a fluid-tight hood detachably secured to said body and adapted to receive said orifice plate when withdrawn from its normal position, the withdrawal path of said orifice plate being free from obstructions, the outer end of said hood being provided with a stuffing box, a withdrawal rod for said orifice plate connected with the latter and passing slidably through said stuffing box, and combined means for fluid-tightly clamping said orifice plate in operative position and for cutting off communication between said flow-bore and said hood when said orifice plate is withdrawn into the latter, said combined means embodying manually actuated means for positively holding it against movement under the influence of fluid within the line.

JAMES O. LEWIS.